United States Patent [19]
Witkowski

[11] 3,807,146
[45] Apr. 30, 1974

[54] MOLD FOR MAKING A FILTER

[76] Inventor: Henry J. Witkowski, 5625 E. Lake Rd., Erie, Pa. 16511

[22] Filed: June 13, 1968

[21] Appl. No.: 755,476

Related U.S. Application Data

[63] Continuation-in-part of Ser. No. 617,561, Feb. 21, 1967, which is a continuation-in-part of Ser. No. 271,161, April 8, 1963, abandoned.

[52] U.S. Cl. .................. 55/357, 55/483, 55/484, 55/491, 55/502, 55/511, 55/522, 55/DIG. 31, 264/219, 264/252, 264/254, 264/274, 264/DIG. 48

[51] Int. Cl. ............................................. B01d 39/14

[58] Field of Search ...... 210/499; 55/357, 483, 484, 55/491, 502, 511, 514, 522, 524, DIG. 31, DIG. 16, DIG. 13; 210/499; 264/219, 252, 254, 274, DIG. 48, 266, 273, 257

[56] References Cited
UNITED STATES PATENTS

| | | | |
|---|---|---|---|
| 2,019,213 | 10/1935 | Dahlman | 55/514 X |
| 2,291,545 | 7/1942 | Granz et al. | 264/257 X |
| 2,521,984 | 9/1950 | Lang | 55/486 |
| 2,852,094 | 9/1958 | Sawle | 55/529 |
| 2,881,859 | 4/1959 | Nutting | 55/354 X |
| 2,886,481 | 5/1959 | Swan | 156/88 |
| 3,017,698 | 1/1962 | Hambrecht et al. | 29/505 |
| 3,082,587 | 3/1963 | Brimberg | 55/495 |
| 3,142,550 | 7/1964 | Kuehne | 55/495 |
| 3,150,220 | 9/1964 | Howell | 264/259 |
| 3,183,285 | 5/1965 | Boylan | 55/490 X |
| 3,183,286 | 5/1965 | Harms | 264/271 X |
| 3,235,633 | 2/1966 | Holloway et al. | 55/502 X |

FOREIGN PATENTS OR APPLICATIONS

741,918  12/1955  Great Britain

Primary Examiner—Dennis E. Talbert, Jr.

[57] ABSTRACT

A self supporting filter and a process for making a self supporting filter which process uses a mold arrangement that pinches the filter material adjacent each side of the mold cavity in which the molding material is to be injected to form the frame of the filter. Thus, the molding material flows from the runner around through the elongated cavity and impregnates the filter material inside the mold but the filter material is squeezed so tight adjacent each side of the cavity that the molding material cannot enter the filter material outside the cavity. Therefore, a frame having well defined edges is formed. The clearance between the mold parts that define the sides of the cavity, which pinch the filter material between the parts, can be in the range of an amount where the material is compressed to remove all voids to a point where the material would shear off. This clearance has been found to be sufficient that the molding material will not be pinched off nor damaged and at the same time plastic will not flash out into the form.

13 Claims, 7 Drawing Figures

PATENTED APR 30 1974

INVENTOR.
HENRY J. WITKOWSKI
BY
Charles L. Lovercheck
att

PATENTED APR 30 1974

INVENTOR.
HENRY J. WITKOWSKI
BY
Charles L. Lovenbeck
attorney

MOLD FOR MAKING A FILTER

This is a continuation-in-part of Patent application, Ser. No. 617,561, filed Feb. 21, 1967 which is a continuation-in-part of Patent application, Ser. No. 271,161, filed Apr. 8, 1963, now abandoned.

This invention relates to filters and, more particularly, to filters for use in air conditioning units, heating appliances, furnaces, and the like.

Previous filters had various types of filtering media supported in rigid frames. These frame were made of several parts of different kinds of material and were expensive to assemble and to build.

It has been discovered that when molding a frame of a material such as plastic material directly to a foam plastic material in a molding press, the plastic material will form an integral part of the foam plastic but the material will migrate away from a frame during the molding operation and it will thereby obstruct the pores of the foam and prevent air from passing through the foam. It will also provide an integral filtering unit. The plastic and foam become integral because the plastic encapsulates the foam.

Various processes have been suggested for molding filter material to frames. No means has been provided in such processes, however, to prevent the molding material from entering the filter material adjacent the frame during the molding process and thereby reducing the value and effectiveness of the filter.

It is, accordingly, an object of the present invention to provide an improved filtering member.

Another object of the invention is to provide an improved method for making filters.

Still another object of the invention is to provide an improved filter.

A further object of the invention is to provide a filter which is simple in construction, economical to manufacture, and simple and efficient to use.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

Figure 1:
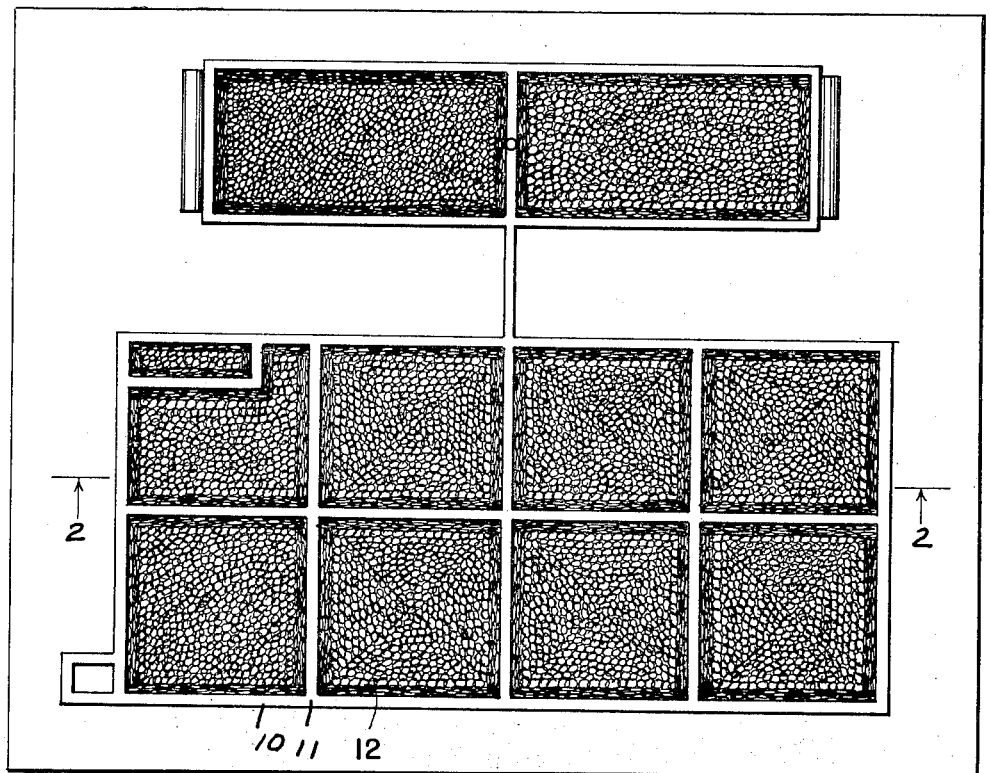
FIG. 1 is a top view of a filter according to the invention.

Now with more particular reference to the drawings, the filter shown in plan view in FIG. 1 is made of reinforcing members which are intersected by bars 10 and 11 which intersect at right angles and form a square grid. The bars 10 and 11 are integrally molded to foam plastic material 12 during the molding process. The grid may be made of a material such a polyethylene or other suitable material.

This is done by placing a suitable sized sheet of foam plastic of, for example, 3/8 inch thick of an open pore type material in an injection molding die indicated at 13, closing the die, and injecting the plastic material into runner 18 to form the grids 10 and 11. A top mold part 14 and a bottom mold part 15 form the mold. The mold has relieved portions in the form of grooves 19 between the raised portions. The relieved portions 19 form the receptacles to receive the foam plastic which is of a thickness and width substantially equal to the areas of foam plastic material 12 between the reinforcing grid members or bars 10 and 11, which are a part of the integral polyethylene grid. Hinges 30 or brackets for attaching the filter to a support may be molded integrally to the grids 10 and 11.

The relieved areas 19 are cut in the bottom portion of the mold and they form spaces deep enough that the foam plastic be received therein will not be damaged. It has been found that .005 inches is generally sufficiently deep for a foam material 3/8 inch thick. These relieved areas will be at least deep enough that the foam material will not be damaged when the die is closed. It is in the grooves 17 that a runner 18 is connected through which the molded plastic is injected. A marginal portion 20 can either side of grooves 17 is provided. The clearance at 20 between the marginal portions must be sufficiently close that the molten plastic will not flow out through the compressed foam yet not so close that the foam will be damaged when it is clamped. It has been discovered that the clearance that will be satisfactory is between the limits of a point where the foam material will be compressed to its absolute volume and the point beyond which it will be compressed beyond its elastic limit.

EXAMPLE I

1. Scott Industrial Foam is 97 percent void or air, that is 3 percent absolute value. To find the absolute volume of a 1/4 inch piece of foam, multiply 1/4 inch (.250) times 3 percent = .0075. This is compressed material thickness.

2. Next, find the factor which will tell how much you can compress this foam material. This factor is based on the elongation of the media (foam) or can be determined from the yield point on a stress-strain curve.

Factor = Elongation (in percent)/Elongation (in percent) + 100 percent

The elongation of Scott's:

Factor = 540 percent divided by 640 percent = 84.38%

3. The amount the foam can be squeezed beyond the .0075 thickness is 84.38 percent times .0075 = .0063.

4. The pinch the media (foam) can withstand without damaging it is .0075 inch minus .0063 = .0012.

5. The amount the mold has to be relieved at the pinch off is .0012.

6. If the calculated range of .0075 inch to .0063 inch is not maintained, then the material will be destroyed becuase of flash.

7. All the above steps hold true for any other media like foam in which there are voids.

Thus, the foam plastic material 12 is squeezed at these marginal portions 20 and forms a barrier to prevent molten plastic from entering the foam material in the relieved portions 19 by way of the portions 20. The part of the foam plastic which extends and overlies the portions 20 is squeezed so that no plastic grid material can flow into the parts of the foam that is not squeezed. Therefore, the porous qualities of the foam are not changed.

It is common practice with ordinary types of filters to make a special sized filter for each different size of application. In the present invention, the reinforcing members 10 and 11 are spaced apart different distances adjacent the edges so that a single large size of filter can be cut down to any of the conventional stock sizes by means of an ordinary pair of scissors when the reinforcing members are made of polyethylene or some similar material. The reinforcing members adjacent the marginal edges are therefore located at positions which would give a particular standard size of filter so that when the material is cut adjacent these, the grid would fit a predetermined size of filter application.

OPERATION

Figure 2:
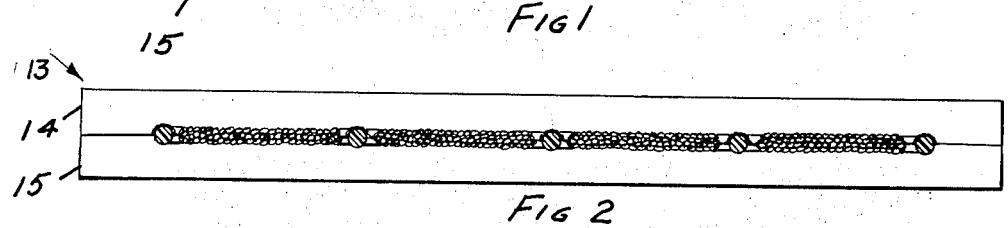
FIG. 2 is a cross-sectional view of the mold for forming the filter taken on a line through the mold corresponding to the line 2—2 which is taken through the filter in FIG. 1.
Figure 3:
FIG. 3 is a partial enlarged cross-sectional view of a part of the filter taken on line 2—2 of FIG. 1.
Figure 4:
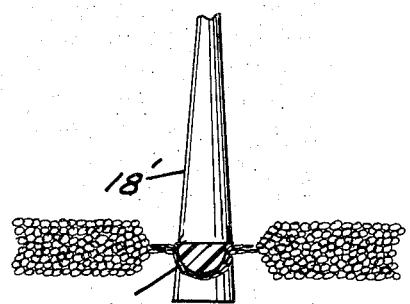
FIG. 4 is an enlarged partial cross-sectional view of FIG. 2, similar to FIG. 3 showing the runner attached.
Figure 5:
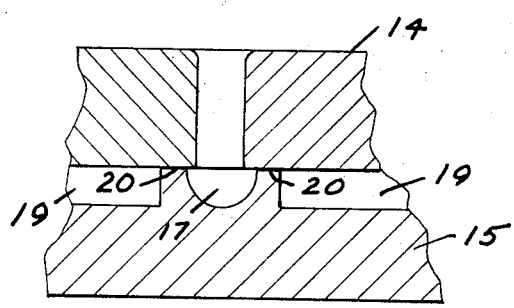
FIG. 5 is an enlarged partial cross sectional view of the mold shown in FIG. 2.
Figure 7:
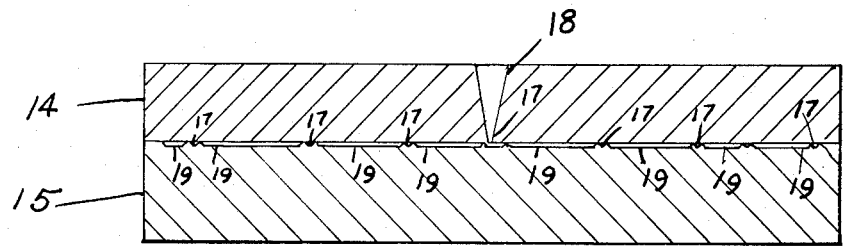
FIG. 7 is a longitudinal cross sectional view of the mold for the filter shown in FIG. 1.
Figure 6:
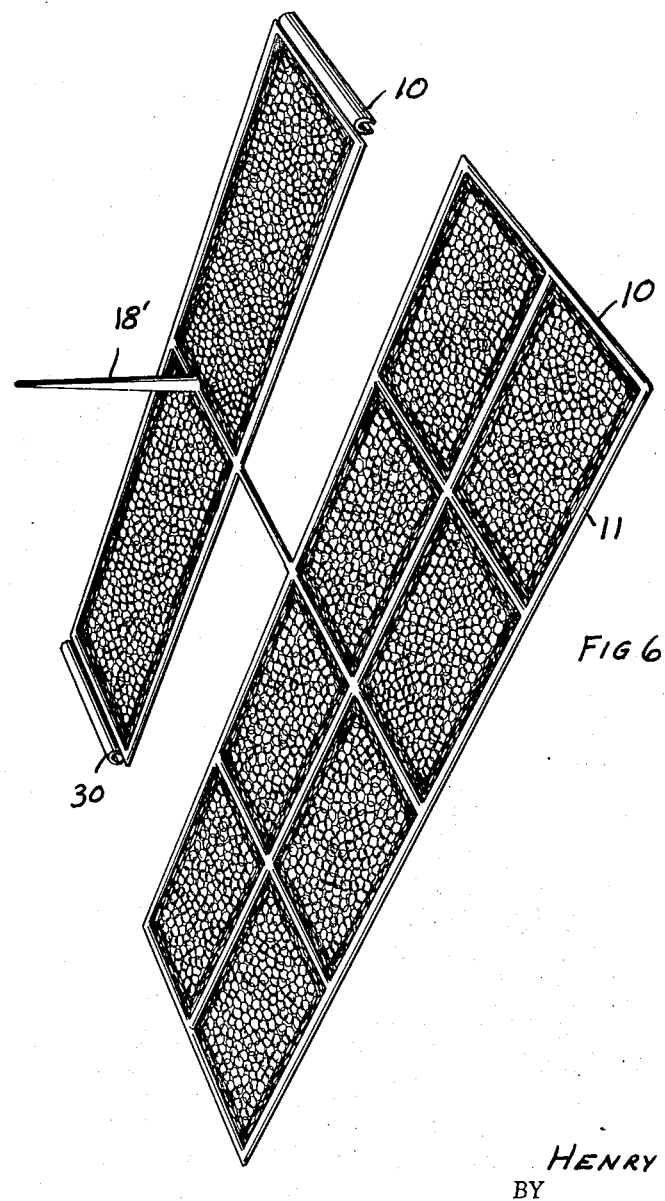
FIG. 6 is a view similar to FIG. 1 of another embodiment of a filter.

In operation, the two mold halves 14 and 15 are mounted in a suitable injection molding press of a type familiar to those skilled in the art. The mold halves are separated and a piece of foam plastic material suitable to be used as a filter is placed between the mold halves. The mold halves are then brought together to the relation shown in FIGS. 2 and 7. This supports the foam material that is to act as a filter in the relieved areas 19. The part of the foam material that is disposed in grooves 17 between portions 20 forms a path for molten plastic material to flow from runner 18 to all parts of groove 17. The molten plastic material forms runner 18' which may be removed and is restrained from relieved portions 19 by the foam material in the marginal portions 20.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A method of molding plastic grid frames on foam material comprising,
   providing a first part and a second part for a mold,
   finishing an outer marginal portion of each said mold part so that said outer marginal portions are in sealing contact with each other when in molding position,
   forming a continuous groove in at least one of said first and said second mold parts to receive material for said grid frame,
   forming pockets in one of said first and said second mold parts to receive portions of said foam to be clear of said plastic grid frame,
   and forming pocket marginal portions on at least one of said first and said second mold parts between said grooves and said pockets,
   the spacing between said first mold part and said second mold part, a said pocket marginal portion being an amount between the limits of:
   $T(1-P)$
   and $T(1-P)(1-K)$
   where T is the thickness of the foam material,
   P is the per cent voids in said foam
   $K = E/(E - 1)$
   and E is the elongation of the material up to the elastic limit, injecting a thermoplastic material into said mold and in contact with and filling the interstices in the portions of said foam material overlying said groove; and curing said thermoplastic material to provide a supporting frame for said filter element integral with said foam material and with portions of said foam material underlying said frame being compressed to prevent air flow therepast.

2. A self-supporting filter element comprising
   a batt/of flexible and nonself-supporting filter material,
   a support border frame extending around the peripheral edge of the surface of said batt and formed of a thermosplastic material diffused into and filling the interstices in the peripheral portion of said batt in contact therewith,
   said portions of said batt extending substantially to the outer edges of said border frame and being compressed to prevent flow therethrough; and
   an intermediate frame formed integrally with and extending between elements of said border frame and formed of the same material as said border frame, said intermediate frame diffusing into and filling the interstices in the portions of said batt in contact therewith,
   said last named portions of said batt being compressed to prevent flow therethrough;
   the parts of said filter element defined by adjacent elements of said border frame and said intermediate frame and between adjacent elements of said intermediate frame and other elements of said intermediate frame being complete self-supporting filter elements such that parts of said self-supporting filter element outwardly of said adjacent elements of said border frame and said intermediate frame are removable to change the dimensions thereof.

3. The self-supporting filter element set forth in claim 2 wherein said border frame and said batt of filter material are rectangular in shape,
   and said intermediate frame includes an element extending between opposite elements of said border frame.

4. The self-supporting filter element set forth in claim 3 wherein said border frame and said intermediate frame are formed on only one surface of said batt of filter material.

5. The self-supporting filter element set forth in claim 2 wherein said border frame and said batt of filter are rectangular in shape,
   and said intermediate frame includes elements extending between opposite elements of said border frame to form a grid-like pattern over said filter batt.

6. The self-supporting filter element set forth in claim 2 wherein said border frame and said intermediate frame are formed only on one surface of said batt of filter material.

7. The self-supporting filter element set forth in claim 2 and further including fastening means formed integrally with said border frame to permit mounting said filter element in a receptacle.

8. A method for forming a self-supporting filter element comprising the steps of;
   placing a batt of flexible nonself-supporting material into a mold having cavities formed in a predetermined pattern therein,
   said batt being located to lie across all of said cavities;
   injecting a thermoplastic material into said mold and in contact with and filling the interstices in the portions of said batt overlying said cavities;
   and curing said thermoplastic material to provide a supporting frame for said filter element integral with said filter material and with said portions of said filter material underlying said frame being compressed to prevent air flow therepast.

9. The method of forming a self-supporting filter element set forth in claim 8 wherein said batt is compressed in said mold adjacent said cavities to seal said cavities and prevent said thermoplastic material from flowing therefrom.

10. The method of forming a self-supporting filter element set forth in claim 9 wherein said cavities are disposed around the peripheral edge of one surface of said batt.

11. The method of forming a self-supporting filter element set forth in claim 10 wherein additional cavities are located in said mold forming a grid-like pattern interconnecting said peripheral cavities.

12. The method of forming a self-supporting filter element set forth in claim 9 wherein said cavities are disposed only on one side of said filter batt when said batt is placed in said mold.

13. The method of forming a self-supporting filter element set forth in claim 9 wherein said thermoplastic material is injected under conditions of heat and pressure into said mold.

* * * * *